(12) United States Patent
Uchihori

(10) Patent No.: US 6,516,389 B1
(45) Date of Patent: Feb. 4, 2003

(54) DISK CONTROL DEVICE

(75) Inventor: Ikuo Uchihori, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 199 days.

(21) Appl. No.: 09/663,714

(22) Filed: Sep. 18, 2000

(30) Foreign Application Priority Data

Dec. 28, 1999 (JP) .............................................. 11-373072

(51) Int. Cl.[7] .............................................. G06F 12/00
(52) U.S. Cl. ...................................... 711/137; 711/113
(58) Field of Search .................................. 711/113, 137

(56) References Cited

U.S. PATENT DOCUMENTS

| | | | | |
|---|---|---|---|---|
| 5,237,666 A | * | 8/1993 | Suzuki et al. ................ | 712/240 |
| 5,694,571 A | * | 12/1997 | Fuller .......................... | 711/113 |
| 5,761,706 A | * | 6/1998 | Kessler et al. ............... | 711/118 |
| 5,765,213 A | * | 6/1998 | Ofer ............................ | 711/137 |
| 5,941,981 A | * | 8/1999 | Tran ............................ | 711/137 |
| 6,012,106 A | * | 1/2000 | Schumann et al. ........... | 710/22 |
| 6,055,622 A | * | 4/2000 | Spillinger ................... | 711/169 |
| 6,134,643 A | * | 10/2000 | Kedem et al. ............... | 711/137 |
| 6,173,392 B1 | * | 1/2001 | Shinozaki ................... | 711/213 |
| 6,253,289 B1 | * | 6/2001 | Bates et al. .................. | 711/118 |

* cited by examiner

*Primary Examiner*—Hiep T. Nguyen
(74) *Attorney, Agent, or Firm*—Finnegan, Henderson, Farabow, Garrett & Dunner, L.L.P.

(57) ABSTRACT

A pre-fetch prediction table is provided for storing history of readout access given from a host device. A controller in a disk control device registers entry information including a set of an area address a indicating the access destination of the previous access and concerned prediction address b, having an area address b indicating the access destination of the readout access given from the host device as prediction address b, into a corresponding entry of the pre-fetch prediction table. Thereafter, when a readout access designating the area address a in agreement with the area address a in the concerned entry information is given from the host device, the controller pre-fetches from a HDD to a disk cache according to the prediction address b in the concerned entry information.

10 Claims, 11 Drawing Sheets

DISK CONTROL DEVICE

CROSS-REFERENCE TO RELATED APPLICATIONS

This application is based upon and claims the benefit of priority from the prior Japanese Patent Application No. 11-373072, filed Dec. 28, 1999, the entire contents of which are incorporated herein by reference.

BACKGROUND OF THE INVENTION

Then present invention relates to a disk control device provided with a disk cache mechanism, used in a computer system, and especially a disk control device for improving the disk cache hit rate during data readout by performing disk cache pre-fetch efficiently, prior to data readout access.

A disk memory device composed of magnetic disk device or the like is usually provided with disk cache mechanism (disk cache) composed of semi-conductor memory (including disk cache memory) for speeding up read/write.

Especially, a RAID (Redundant Array of Inexpensive Disks) device using a plurality of disk devices (disk drives) has often large capacity cache memory mounted.

Howsoever, in many cases, disk cache has an effect to speed up apparently writing from the host computer (host device) as data write buffer, whilst its speeding up effect is small in data readout. This is because the cache hit rate is low, as readout access to a disk memory device is often not localized.

Hit rate can be improved by performing pre-fetch from disk device to cache memory, prior to data readout access. However, in practice, it is impossible to confirm from where to pre-fetch. Thus, conventionally, pre-fetch has been performed supposing sequential readout.

As mentioned above, in conventional disk memory device provided with disk cache, pre-fetch has been performed supposing sequential readout.

Nonetheless, in fact, data readout access from a host computer to a disk memory device is not always sequential. Viewed from the host computer side, it is actually by file, table search, readout of a set of several files, or other correlations may be revealed, but the disk memory device side treats them simply as random access, because these patterns can no be recognized.

Therefore, conventionally, pre-fetch to disk cache had effect only in limited cases, and sometimes it had no effect at all.

BRIEF SUMMARY OF THE INVENTION

The present invention has been made considering the situation mentioned above and has an object to provide a disk control device for improving the disk cache hit rate, by performing disk cache pre-fetch efficiently using access history.

In the present invention, a disk cache control device provided with a disk cache for temporarily storing a part of data on a disk device comprises a readout access history table for storing history of readout access given be a host device, readout access execution means for transferring accessed data to the host device using the disk cache when a readout access is given from the host device, registration means for registering corresponding readout access history information in the readout access history table linking with previous readout access history information based on the readout access given from the host device, and pre-fetch means for predicting the following readout access contents from the readout access given from the host device and the readout access history stored in the readout access history table, and pre-fetching the concerned data from the disk device to the disk cache, if concerned data does not exist in the disk cache.

Such configuration allows to record data readout access history in the readout access history table, to pre-fetch effectively by predicting the following access using the data readout access history when a data readout access is accepted, and to improve the disk cache hit rate.

Here, if well-known sequential pre-fetch means for sequentially pre-fetching following data to the data requested by a readout access given from the host device is added, and pre-fetch by this sequential pre-fetch means and a novel pre-fetch by the pre-fetch means are used in combination, the disk cache hit rate can be improved further.

Besides, as for data structure of the readout access history table, a data structure for storing respective readout access in a history information set format including the corresponding readout access history information as a first readout access history information, and readout access history information of the following readout access as a second readout access history information, may be applied. In this case, the pre-fetch means may pre-fetch according to the second readout access history information among history information sets taking the readout access history information corresponding to the readout access given from the host device as the first readout access history information. Here, accessed address information indicating access destination may be used as readout access history information corresponding to the readout access. The readout access history table data structure of this case is called the first data structure.

Moreover, in the configuration mentioned above, the registration means may be provided with new registration means and modification registration means, and such configuration that, when a readout access is given from the host device and no history information set including the first readout access history information corresponding to a previous readout access exist in the readout access history table, a history information set including the first readout access history information corresponding to the previous readout access, and a history information set including the second readout access history information corresponding to the given readout access are newly registered in the readout access history table, while, if a history information set including the first readout access history information corresponding to a previous readout access exists in the readout access history table and, at least, the second readout access history information corresponding to the given readout access is not included in the concerned history information set, the second readout access history information in the concerned history information set is modified into the second readout access history information corresponding to the given readout access may be applied.

In addition, as readout access history table data structure, in place of the first data structure, a second data structure for storing respective readout access in a history information set format including a predetermined address portion whose predetermined unit area can be designated in an access destination address information indicated by the concerned access as the first readout access history information, and the concerned access destination address information of the first readout access showing an access destination address information different from the concerned access in predetermined address portion after the concerned access as the second readout access history information may be applied. In this case, the pre-fetch means may pre-fetch according to the second readout access history information among history information sets taking the predetermined address portion of the access destination address information indicated by the readout access given from the host device as the first readout access history information.

Here, such configuration that, when a readout access whose predetermined address portion of the access destination address information is different from the previous one is given from the host device and no history information set including the first readout access history information corresponding to a previous readout access exist, a history information set including the first readout access history information corresponding to the previous readout access, and the second readout access history information corresponding to the given readout access are newly registered, while, if a history information set including the first readout access history information corresponding to a previous readout access exists and, at least, the second readout access history information corresponding to the given readout access is not included in the concerned history information set, the second readout access history information in the concerned history information set is modified into the second readout access history information corresponding to the given readout access may be applied.

In the configuration using the readout access history table of the second data structure, the readout access history table size can be compressed, as registration to the readout access history table is suppressed for readout access becoming sequential readout to the previous readout access.

Additionally, as readout access history table data structure, a third data structure for storing respective readout access in a history information set format taking the access destination address information indicated by the concerned access as the first readout access history information, and the access destination address information indicated by the first readout access out of the sequential readout beginning from the access destination address information indicated by the concerned access after the concerned access as the second readout access history information, and including information on continuous access number in the sequential readout may more preferably be applied. In this case, the pre-fetch means may pre-fetch according to the second readout access history information among history information sets taking the predetermined address portion of the access destination address information indicated by the readout access given from the host device as the first readout access history information, and corresponding continuous access number.

Here, such configuration that, when a readout access out of sequential readout is given from the host device and no history information set including the first readout access history information corresponding to a previous readout access which is a readout access indicating the access destination address information of the concerned sequential readout exist in the readout access history table, a history information set including the first readout access history information corresponding to the previous readout access, the second readout access history information corresponding to the given readout access, and continuous access number information in the concerned sequential readout is newly registered, while, if a history information set including the first readout access history information corresponding to a previous readout access exists and, at least, the second readout access history information corresponding to the given readout access is not included in the concerned history information set, the second readout access history information in the concerned history information set is modified into the second readout access history information corresponding to the given readout access, and continuous access number information in the concerned history information set is modified into continuous access number information of the concerned sequential readout may be applied.

In the configuration using the readout access history table of the third data structure, it is possible to prevent useless pre-fetch from generating and to realize an efficient pre-fetch, because pre-fetch by the pre-fetch means can be performed according to the second readout access history information in a history information set taking the destination address information indicated by the readout access given from the host device as the first readout access history information, and the corresponding continuous access number. Moreover, when sequential pre-fetch is used at the same time, an effective sequential pre-fetch can be realized, because data following the data accessed by a readout access given from the host device can be sequentially pre-fetched according to the continuous access number information stored in readout access history table making a set with the first readout access history information corresponding to the concerned previous readout access.

If a fourth data structure allowing to register a plurality of second access history information, in accordance with the first readout access history information is used in place of the third data instruction, the disk cache hit rate can be further improved because pre-fetch can be performed respectively according to the plurality of second access history information and the corresponding continuous access number.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
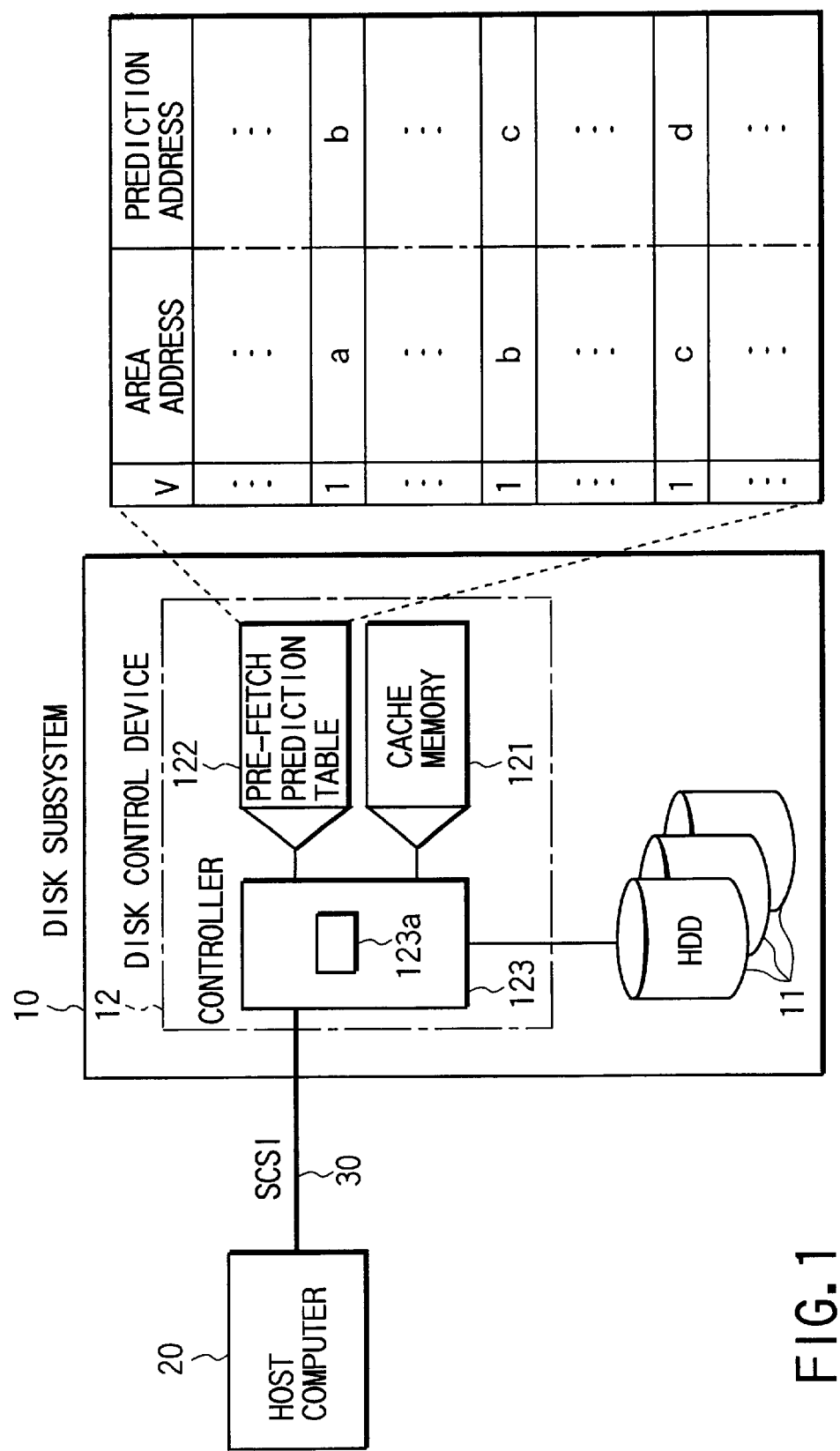
FIG. 1 is a block configuration diagram of a computer system provided with a disk memory device according to a first embodiment of the present invention.

Now, embodiment of the present invention will be described referring to the drawings.

[First embodiment]

FIG. 1 is a block configuration diagram of a computer system provided with a disk memory device according to a first embodiment of the present invention.

In FIG. 1, a disk subsystem 10 is connected with a host computer (host) 20 through a predetermined interface, for instance SCSI (Small Computer System Interface) 30.

In place of SCSI 30, supposing Fibre Channel, IEEE 1394 or other channel interfaces, or card RAID, PCI (Peripheral Component Interconnect Bus) or other inner I/O bus interfaces in the host computer 20 can be used.

The disk subsystem 10 comprises at least one disk device, such a plurality of magnetic disk devices (called HDD, hereinafter) 11 composing a disk array represented by RAID, and a disk control device 12 for controlling the whole disk subsystem 10 in response to the access from the host computer 20 sent via the SCSI 30.

The disk control device 12 comprises a disk cache (disk cache mechanism) 121 (having disk cache memory) composed of semiconductor memory, a pre-fetch prediction table 122, and a controller 123 for controlling these respective sections.

This disk control device 12 is largely different from conventional disk control devices (disposed in the disk memory device) in the addition of pre-fetch prediction table 122.

Besides, the addition of pre-fetch prediction table 122 makes the controller 123 control contents partially different from the conventional ones. In addition, the controller 123 includes a register (called previous access register, hereinafter) 123a as holding means for holding information of area address designated by previous readout access from the host computer 20. This register 123a may be a hardware register (physical register) or a software register (logical register) secured on a memory of the controller 123.

The pre-fetch prediction table 122 is used to predict next accessed data based on the access destination disk address (called area address, hereinafter) designated by the data readout access sent from the host computer 20, namely data to be pre-fetched to the disk cache 12.

Before describing this pre-fetch prediction table 122 in detail, the technical background leading to the addition of the table 122 will be described.

First, when the host computer 20 accesses to read the disk subsystem 10, the controller 123 disposed in the disk control device 12 of the concerned disk subsystem 10 refers to (a tag memory not shown in) the cache memory 121.

If the accessed data does not exist in the cache memory 121, namely in case of miss hit, the controller 123 reads out concerning data from the HDD 11, stores it in the disk cache, and transfers the data to the host computer 20.

On the contrary, if the accessed data exists in the cache memory 121, namely in case of hit, the controller 123 reads out concerning data from the cache memory 121 without accessing the HDD 11, and transfers the data to the host computer 20.

AS the cache memory 121 is composed of semiconductor memory, it can be accessed faster than the HDD 11. Consequently, viewed from the host computer 20, if the cache memory 121 is hit, data can be read out faster, as the HDD 11 is not accessed. In other words, the more the cache memory 121 is hit, the faster becomes the disk subsystem 10.

Now, in order to improve the cache memory 121 hit rate, when a readout access from the host computer 20 is executed as mentioned above, the next accessed data may be predicted from the concerned access, and this predicted data may be pre-fetched (anticipated) from the HDD 11 to the cache memory 121, before the host computer 20 sends the next readout access.

Thus, when the host computer 20 actually sends the next data readout access thereafter, the data can be read out faster, as the concerned data is already in the cache memory 121.

Here, the problem concerns a method to predict by the controller 123 the next data to be accessed by the host computer 20. In the conventional art, pre-fetch has been performed predicting simply that the data following the previous data would be accessed, namely supposing a sequential readout access.

However, as mention under the rubric of Prior Art, in practice, the readout access from the host computer 20 to the disk subsystem 10 is not always sequential, pre-fetch to disk cache was effected in only limited cases, and sometimes had no effect at all.

Therefore, in this embodiment, a pre-fetch prediction table 122 to record access (readout access) history is added in the disk control device 12 in order to predict data to be accessed by the host computer 20 more effectively than the prior art by means of the table 122.

In the configuration of FIG. 1, the pre-fetch prediction table 122 is connected to the controller 123, and shown as if the table is prepared as an exclusive hardware.

Nonetheless, the pre-fetch prediction table 122 may also be composed logically in the memory (not shown) of the controller 123, or in a certain area of the cache memory 121.

The configuration of the pre-fetch prediction table 122, any of direct mapping, set associative or full associative method may be applied. Here, full associative method will be applied.

Each entry of the pre-fetch prediction table 122 includes a field (area address field) to set HDD 11 area address (as first readout access history information), a field (prediction address field) to set area address accessed by the host computer 20 following the data readout access using the area address as prediction address (second readout access history information) and a field (V field) to set a flag information (V flag) indicating if the concerned entry contents are effective or not.

If the pre-fetch prediction table 122 is to be composed by direct mapping or set associative method, area address upper bit is set to use, in area address filed of the entry designated by lower rank of the area.

Now the operation of the disk subsystem 10 will be described referring to the flow charts of FIG. 2 and FIG. 3, taking the example of processing when a data readout access from the host computer 20 is accepted (readout access processing).

First, suppose the host computer 20 accesses the read out data to disk subsystem 10.

Upon the reception of data readout access from the host computer 20, the controller 123 disposed in the disk control device 12 of the disk subsystem 10 checks if the accessed data exists in the cache memory 121, by referring to the cache memory 121 in the area address designated by the access (step S1).

In case of miss hit that the accessed data does not exist in the cache memory 121, the controller 123 reads out the accessed readout data from the HDD 11, stores it in the cache memory 121 (step S2), and transfers the data to the host computer 20 (step 3).

On the contrary, if the accessed data exists in the cache memory 121, namely in case of hit, the controller 123 reads out the accessed readout data from the cache memory 121 without accessing the HDD 11, and transfers the data to the host computer 20 (step 3).

Next, the controller 123 performs prediction table registration processing (step 4) described below.

First, the controller 123 extracts the area address designated by the previous data readout access held in the previous access register 123a, namely previous access area address, and refers to the pre-fetch prediction table 122 with the area address (step S11).

Then, the controller 123 checks if a valid entry having previous access area address, namely an entry (valid corresponding entry) corresponding to the previous access area address and whose V flag is for instance 1 (ON state) exists or not (step S12).

If no valid corresponding entry exist, the controller 123 secures an entry for registration, for instance one vacant entry, on the pre-fetch prediction table 122, and registers entry information including a set of previous access area address and the concerned prediction address (history information set) in this secured entry (step S13).

Here, V flag is set to 1 (ON state). If there is no vacant entry, for instance, a entry decided by LRU (Least Recently Used) method, namely most previously referred entry may be used as registration entry.

Then, the controller 123 modifies the contents of the previous access register 123a into the area address accessed this time (step S16) to conclude a series of prediction table registration processing (step S4).

The processing mentioned above allows to register the entry information including a set of the previous access area address and the present access area address in the entry corresponding to the previous access area address of the pre-fetch prediction table 122.

On the other hand, if it is judged that a valid corresponding entry exists by the step S12, the controller 123 checks if the contents of the prediction address field in the entry agree with the present access area address or not (step S14).

If they do not agree, the controller 123 replaces the contents of the prediction address field with the present access area address (step S15). Then, the controller 123 replaces the contents of previous access register 123a with the present access area address (step S16) to conclude the prediction table registration processing (step S4).

On the contrary, if they agree, the controller 123 concludes the prediction table registration processing (step S4) only be replacing the contents of previous access register 123a with the present access area address (step S16).

If a valid corresponding area exists, the prediction address field contents of the entry may well be replaced with the present access area address, without performing the judgment of the step S14.

What is described above applies to the case where the pre-fetch prediction table 122 adopts the full associative method. If it is of direct mapping or set associative method, as processing equivalent to the steps S11, S12, the entry of the pre-fetch prediction table 122 designated by a predetermined lower bit of the area address may be referred to, and it may be checked if a valid corresponding entry exists or not according to if the contents of the area address field of that entry is a valid entry agreeing with the value of a predetermined higher rank field of the area address.

Upon the conclusion the prediction table registration processing (step S4), the controller 123 checks if data of the address following the present access area address exists in the cache memory 121 or not (step S5).

If it does not exists, in other words, if the cache memory 121 is not hit, a so-called sequential pre-fetch is performed to pre-fetch the data of the address following the present access area address from the HDD 11 to the cache memory 121 (step S6), before proceeding to the step S7. On the contrary, if hit, it proceeds to the step S7 as it is.

In the step S7, the controller 123 extracts a prediction address paired with the concerned area address, by referring to the corresponding entry in the pre-fetch prediction table 122 with the present access area address.

This prediction address is an area address designated by a data readout access sent following the data readout access designated by the address agreeing with the present access area address, if it is emitted most recently.

Next, referring to the cache memory 121 with the extracted prediction address, the controller 123 checks if the prediction address data exists in the cache memory 121 or not (step S8).

If it exists, the controller 123 terminates a series of readout access processing and waits for the next data readout access. If the next data readout access is already emitted, a new readout access processing corresponding to the next data readout access will be performed.

On the contrary, if the prediction address data does not exist in the cache memory 121, the controller 123 pre-fetches the prediction address data from the HDD 11 to the cache memory 121 (step S9) to conclude a series of prediction table registration processing.

In the aforementioned description, for the convenience of flow chart drawing, data accessed by the host computer 20 is transferred to the host computer 20, then sequential pre-fetch is performed, and pre-fetch based on the prediction address is performed after this sequential pre-fetch; however, they may also be performed in parallel. Pre-fetch parallel operation can be performed effectively in a configuration comprising a plurality of HDD 11 composing a disk array, especially like in this embodiment.

Now, the concrete example of readout access processing mentioned above will be explained referring to FIG. 4.

Figure 4:
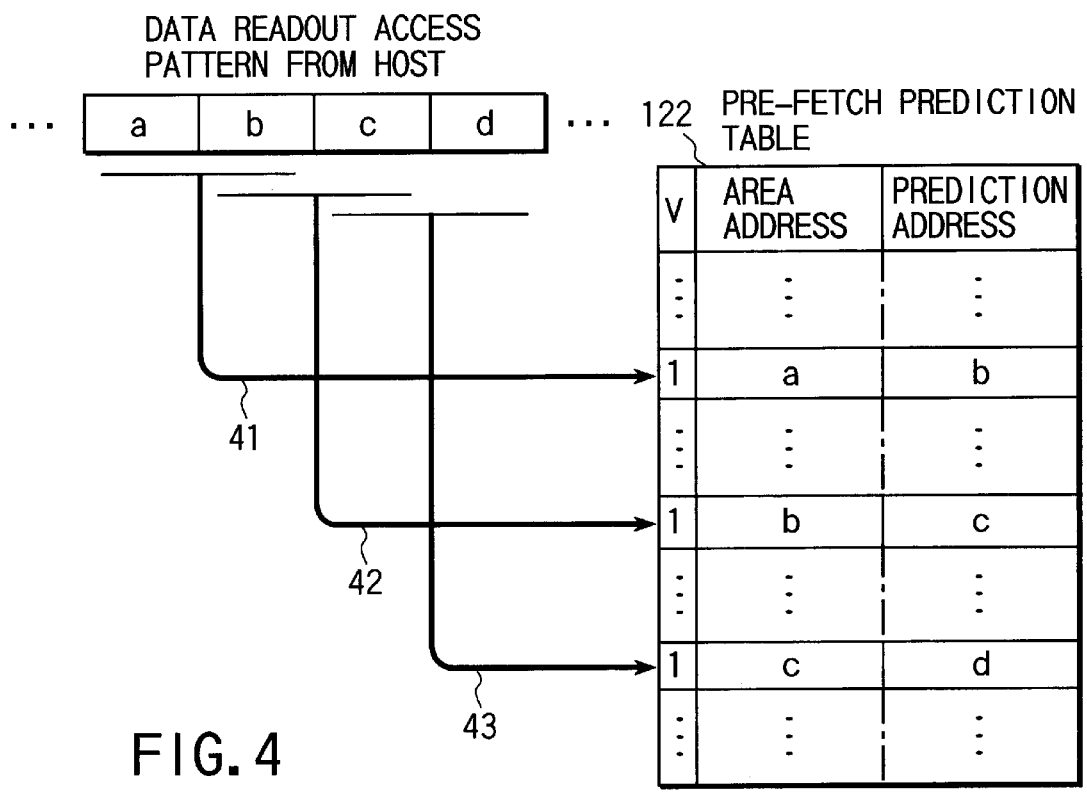
FIG. 4 is a drawing for illustrating a concrete example of prediction table registration processing in the first embodiment.

First, as shown in FIG. 4, suppose data readout is accessed for an area address a (and size 1, here size per sector) and then data readout is accessed for an area address b (and size 1).

In this case, a set of the area address a (or a partial address sufficient for specifying a predetermined unit of disk area designated by a) and the prediction address b is registered in an entry corresponding to a of the pre-fetch prediction table 122, as shown by the arrow 41 in FIG. 4.

Further, if there is another access for an area address c, a set of the area address b (or a partial address sufficient for specifying a predetermined unit of disk area designated by b) and the prediction address c is registered in an entry corresponding to b of the pre-fetch prediction table 122, as shown by the arrow 42 in FIG. 4.

Similarly, if there is still another access for an area address d, a set of the area address c (or a partial address sufficient for specifying a predetermined unit of disk area designated by c) and the prediction address d is registered in an entry corresponding to c of the pre-fetch prediction table 122, as shown by the arrow 43 in FIG. 4.

Thus, in a chained manner, entries in the pre-fetch prediction table 122 are registered.

In such situation, if data readout is accessed again for an area address a, the controller 123 of the disk subsystem 10 reads out the corresponding data from the HDD 11 or the cache memory 121, for the area address a, and returns it to the host computer 20.

Thereafter, or in parallel, the controller 123 refers to the pre-fetch prediction table 122 with the area address a, and extracts the prediction address b paired with the area address a.

Then, if the data of extracted prediction address b does not exists in the cache memory 121, namely in case of disk cache miss hit, the controller 123 prefetches data of the prediction address b to the cache memory 121.

Namely, the controller 123 pre-fetches predicting that the host computer 20 will access readout in the same order as before.

As the result of the aforementioned pre-fetch, if the host computer 20 executes a data readout access for the area address b following a readout access for the area address a, the cache memory 121 is always hit. In this case, data of the area address b can be read out faster.

Here, it is to be noted that, if the prediction is not perfect, for instance, even if readout is accessed for the area address b two accesses after the readout access for the area a, there is every possibility that the cache memory 121 is hit.

Thus, in this embodiment, the hit rate of the cache memory 121 is improved, even if readout access pattern recorded in the pre-fetch prediction table 122 is not perfectly identical to the readout order from the host computer 20, provided that there is some correlation, because history of area address accessed by the host computer 20, namely data readout access pattern from the host computer 20 is recorded in the pre-fetch prediction table 122 by registering the accessed area address as prediction address mating with the previous access area address, for each and every data readout access from the host computer 20 and, at the same time, when a new readout access is sent from the host computer 20, prediction address data is pre-fetched from the HDD 11 to the cache memory 121 using the prediction address paired with the accessed area address.

Moreover, in this embodiment, conventional sequential pre-fetch operation is used in parallel, and if data readout for the area address a is accessed, for example, data of the next area address a+1 is also pre-fetched.

For this reason, the hit rate of the cache memory 121 is more improved than the case where a pre-fetch operation using only the prediction address is applied. Nonetheless, sequential pre-fetch is not necessarily a sine qua non.

[Second embodiment]

Now, the second embodiment of the present invention will be described.

This embodiment is characterized by that an entry information registration method of the pre-fetch prediction table 122 applied to the first embodiment is devised. According to this, the control contents of the controller 123 are partially different from the first embodiment, however, block diagram of FIG. 1 and flow chart of FIG. 2 are used for convenience.

In general, data readout unit from the host computer 20, dependent of the file structure of the like, is larger than the disk subsystem 10 side least access unit (for example, sector).

In this case, viewed from than the disk subsystem 10 side, the general pattern will be a sequential access succession for some extent. In such case, if the registration operation to the pre-fetch prediction table 122 of the structure shown in FIG. 4 is executed according to the prediction table registration processing of the flow chart in FIG. 3 for each readout unit (readout access) from the host computer 20 as in the first embodiment, sequential pattern portions may possibly be registered, increasing useless information.

Therefore, it would be devised not to register for sequential readouts, such as a set whose previous access area address is a, size 1 (sector), present access area address a+1 and size a, or a set whose previous access area address is a, size k, present access area address a+k, size n+1−k, and to register the set of leading addresses a, b of this sequential readout at the time of next discontinuous readout access such as area address b.

However, thereafter, a readout access for area address a+1 may be sent. For this reason, in this embodiment, a prediction table registration processing wherein the area of HDD 11 is divided with a constant unit, the area address is decomposed into a predetermined upper address portion (called leading head address, hereinafter) indicating the constant unit and offset, and a set of that leading head address and prediction address that is a discontinuous area address is registered in the pre-fetch prediction table 122 is applied.

Figure 5:
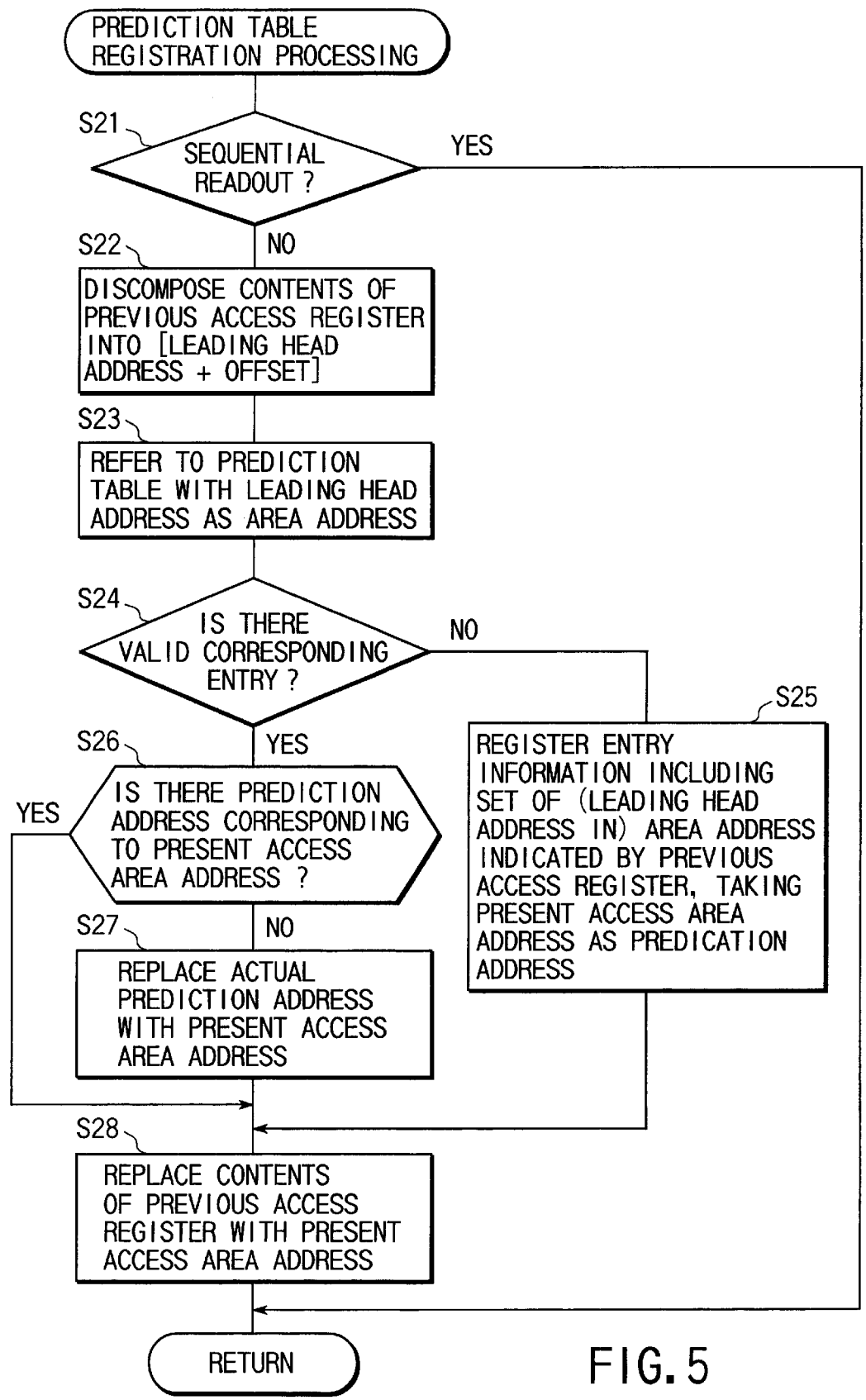
FIG. 5 is a flow chart showing the procedure of prediction table registration processing in a second embodiment of the present invention.

The procedure of the prediction table registration processing applied to this embodiment is shown in the flow chart of FIG. 5, a concrete example in FIG. 6, and difference with the first embodiment will be described concretely.

Figure 6:
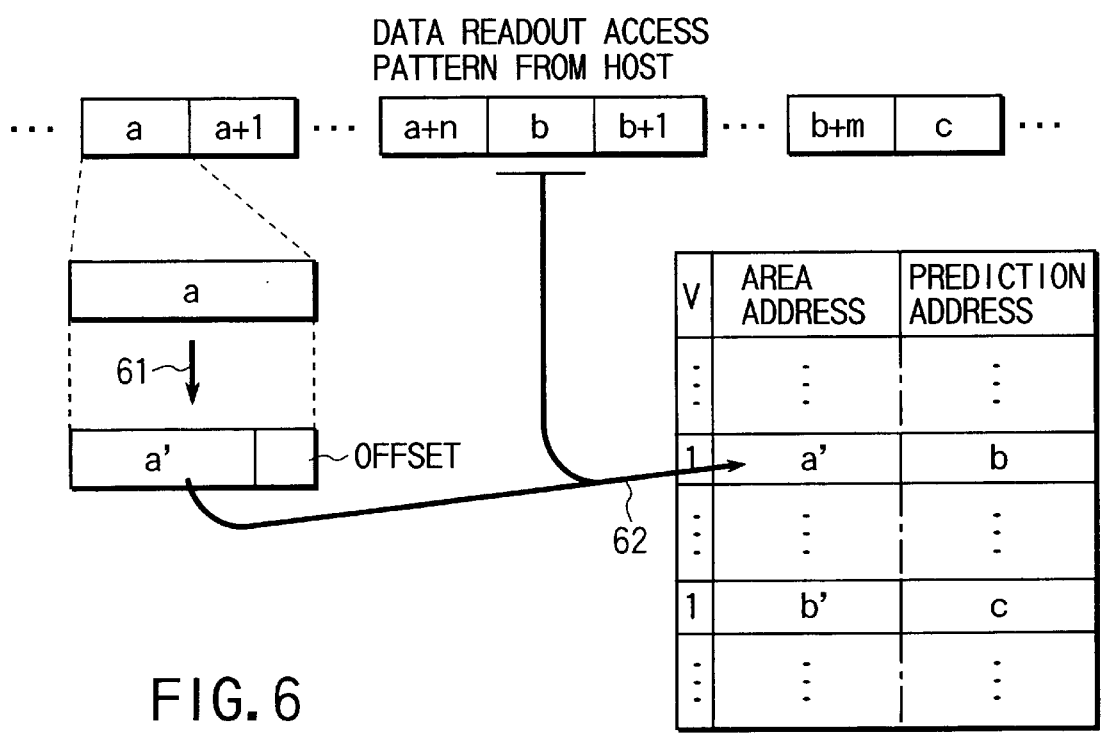
FIG. 6 is a drawing for illustrating a concrete example of prediction table registration processing in the second embodiment.

First, when the accessed address is continuous to the area address accessed by the previous readout access such as a, a+1, a+n shown in FIG. 6, namely for sequential readout (step S21), the controller 123 terminates as it is a series of prediction table registration processing (step S4) without registering entry information in the pre-fetch prediction table 122 nor changing the contents of the previous access register 123a.

Consequently, at the step when readout access a, a+1, . . . a+n succeed like in the example of FIG. 6, and then a discontinuous readout access b succeeds, in other words, at the step when a first readout access b out of sequential readouts beginning from a is given, the area address a would be held in the previous access register 123a.

Here, sequential readout is not limited to a series of readout access by 1 sector wherein area addresses are continuous as in the example of a, a+1, . . . a+n, but also a succession of a readout access designating readout of a data, for example, whose area address is a, size is k, and a readout access designating readout of a data whose area address is a+k, size is n+1−k. This is applied similarly to the third and fourth embodiments mentioned below.

Now, when a readout access for b is sent from the host computer 20 after a readout access for a+n, namely when it is no more sequential readout access (step S21), the controller 123 discomposes the area address a set in the previous access register 123a into leading head address a' and offset, as shown by the arrow 61 in FIG. 6 (step S22).

Then the controller 123 takes the leading head address a' (as the area address in the pre-fetch prediction table 122) and refers to the pre-fetch prediction table 122 with (the area address), and if the corresponding valid entry does not exists, registers entry information including a set of a' and b into the pre-fetch prediction table 122, as shown by the arrow 62 in FIG. 6.

On the other hand, if a valid entry corresponding to a' exists, and the prediction address registered in the entry paired with a' is not b (present access area address), the prediction address in the entry is changed to b (steps S23, S24, S26, S27).

Here, if the valid corresponding entry exists, the contents of the prediction address field of the entry may also be changed to the present access area address irrespective of whether the prediction address registered in the entry paired with a' is or is not b.

Then the controller 123 changes the contents of the previous access register 123a to the present access area address (step S28) and terminates a series of prediction table registration processing (step S4).

In this embodiment to which such prediction table registration processing is applied, an operation to pre-fetch sequentially data from a+1 for instance by a predetermined size (step S6) when a data readout access for the area address a is sent thereafter from the host computer 20, and an operation to pre-fetch data from b (registered as prediction address paired with the leading head address a' of the area address a in the pre-fetch prediction table 122) by, for instance, a predetermined size (sequential pre-fetch) (step S9) are performed sequentially or in parallel.

Thus, the size of the pre-fetch prediction table 122 can be compressed by the configuration not to register into the pre-fetch prediction table 122 for the readout access whose area addresses are continuous. When this configuration is applied, it is preferable to use the sequential pre-fetch at the same time, considering the hit rate of the cache memory 121.

[Third embodiment]

Now, the third embodiment of the present invention will be described.

This embodiment is characterized by that an entry information registration method of the pre-fetch prediction table 122 applied to the first embodiment is devised. According to this, the control contents of the controller 123 are partially different from the first embodiment, but the block diagram of FIG. 1 is used for convenience.

As mentioned above, viewed from than the disk subsystem 10 side, the general pattern of readout access from the host computer 20 will be a sequential access succession for some extent.

In such case, in the second embodiment, entry information including a set of leading head address as area address and prediction address is registered, at the stage when a new discontinuous readout access is emitted.

However, in the second embodiment, the pre-fetch prediction table 122 side can not predict the number of succession of sequential readout access, possibly increasing useless information.

Figure 9:
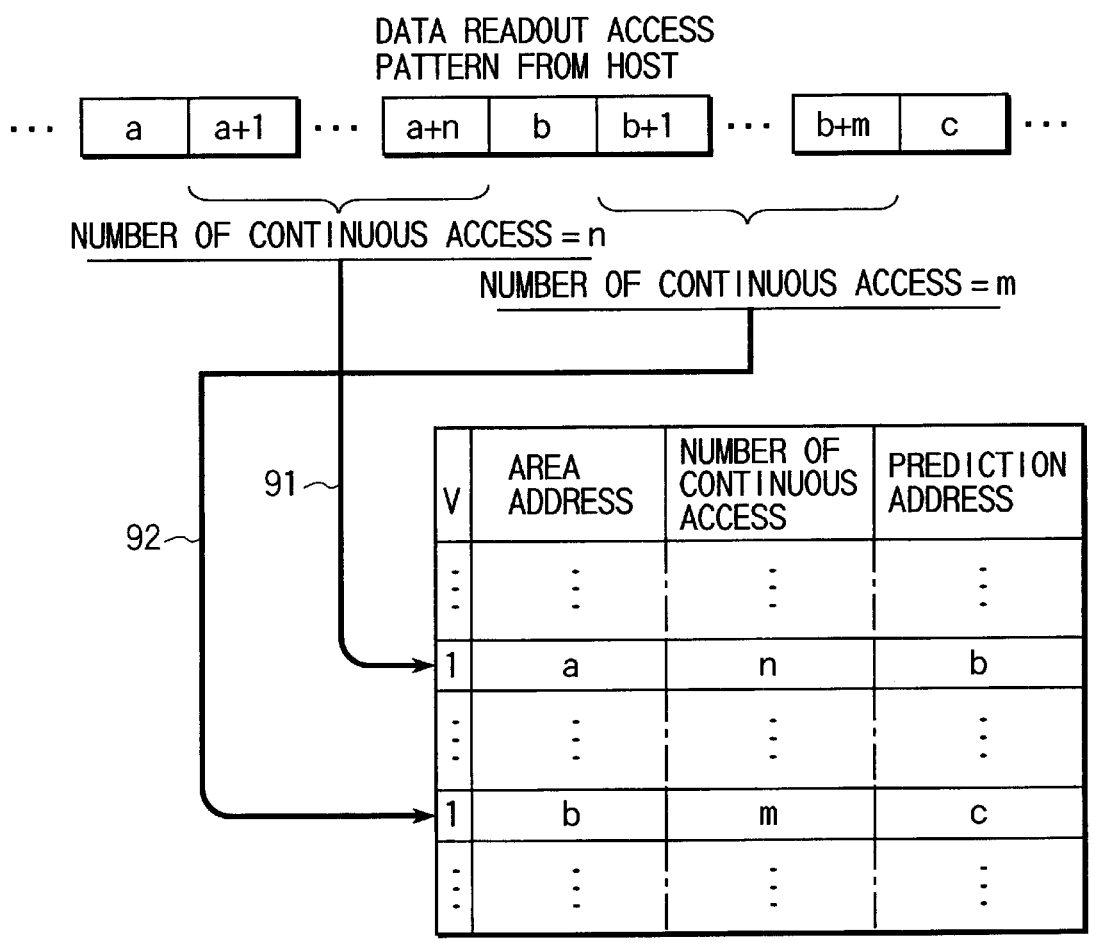
FIG. 9 is a drawing for illustrating a concrete example of prediction table registration processing in the third embodiment.

Therefore, in this embodiment, a prediction table registration processing, for adding, as shown in FIG. 9, a field (continuous access number field) for registering information (called continuous access number, hereinafter) of the number (such a sector number) of succession of sequential readout access, to each entry of the pre-fetch prediction table 122, and for registering entry information (history set) adding the continuous access number to a set of area address (previous access area address) and prediction address (present access area address) similar to the first embodiment, when a discontinuous readout access is sent, is applied.

The procedure of the readout access processing applied to this embodiment is shown in the flow chart of FIG. 7, the procedure of the prediction table registration processing in the flow chart of FIG. 8, a concrete example in FIG. 9, and difference with the first embodiment will be described concretely.

Figure 2:
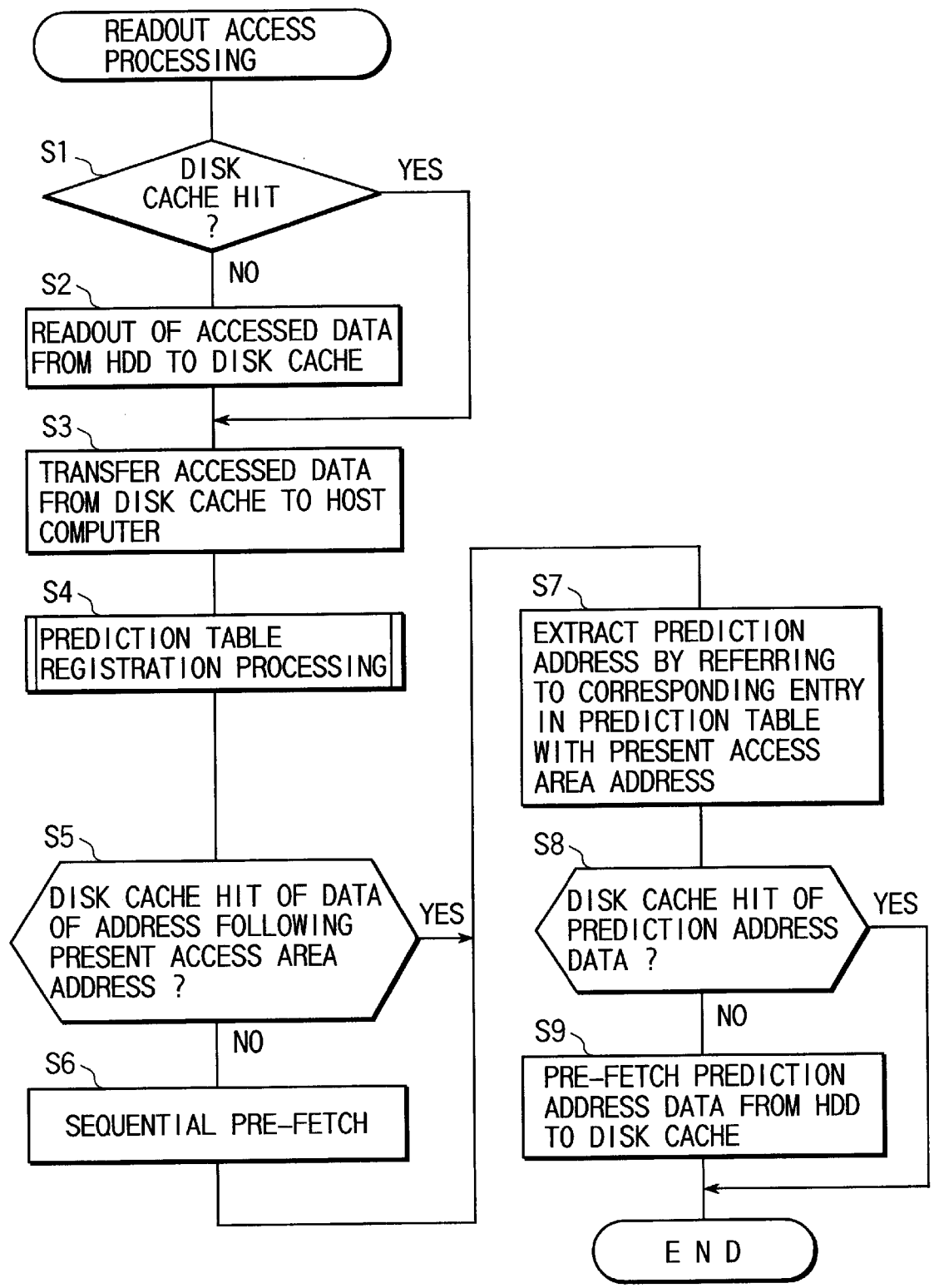
FIG. 2 a flow chart showing the procedure of readout request processing in the first embodiment.
Figure 3:
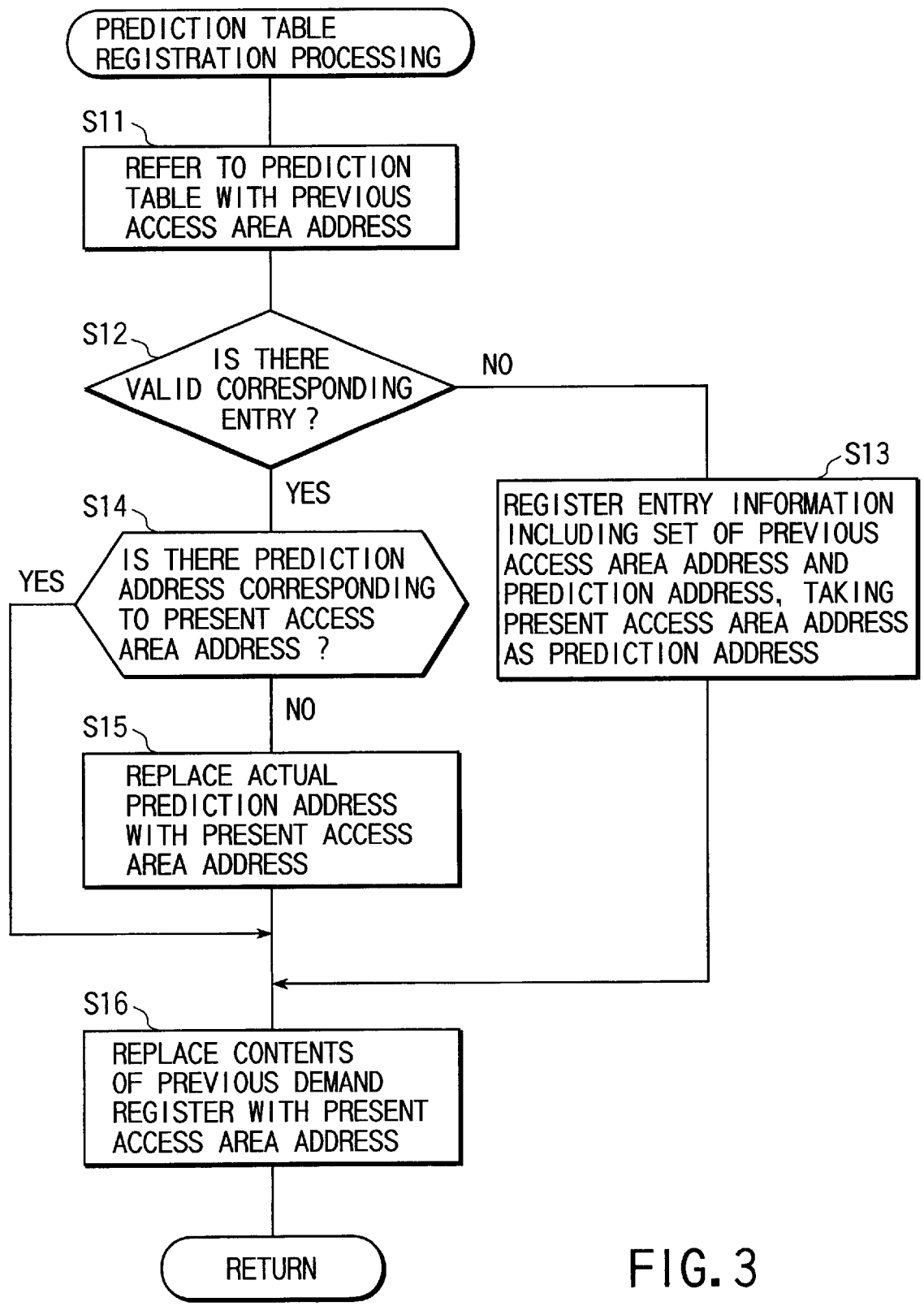
FIG. 3 is a flow chart showing the procedure of prediction table registration processing (step S4) in FIG. 2.

First, when a readout access is sent from the host computer 20, processings S31 to S33 similar to the steps S1 to S3 in FIG. 2 are performed, before proceeding to prediction table registration processing (step S34).

In this prediction table registration processing (step S34), no entry information will be registered in the pre-fetch prediction table 122, while readout access for a, a+1, . . . a+n continue as the example of FIG. 9, namely in case of sequential readout access (step S51).

In this case, the controller 123 terminates a series of prediction table registration processing (step S34) by updating the previous access register in the step S59, mentioned below.

Different from the first embodiment, the previous access register 123a holds a set of previous access area address and the number of continuous access, in this embodiment. In the updating processing of the step S59, the controller 123 increments the number of continuous access in the previous access register 123a by the size of present access, without changing the area address, here.

Therefore, immediately after the succession of readout access of a, a+1, . . . a+n as in the example of FIG. 9, the contents of previous access register 123a will be area address=a (beginning with a), the number of continuous access=n+1.

Namely, in this embodiment, the previous access area address indicated by the previous access register 123a designates the leading head address of the case when a series of sequential readout access are taken as a single readout access.

Suppose the host computer 20 emits a readout access for a+n, and then a readout access for b discontinuous to this. In this case, as it is not a sequential readout (step S51), the controller 123 refers to the pre-fetch prediction table 122 with previous access area address held in the previous access register 123a (step S52).

Here, as the previous access register 123a holds (previous access) area address=a, (previous access) number of continuous access=n+1, the pre-fetch prediction table 122 is referred to with the area address a.

If no valid entry corresponding to the area address a exists (step S53), the controller 123 takes the present access area address b as prediction address, and registers entry information including a set of area address held in the previous access register 123a, namely area address a of previous access (at the time of first access of sequential readout access such as a, a+1, . . . a+n), the prediction address b, and the number of continuous access beginning from a+1 (called number of continuous access of previous access), indicated by the number of continuous access held in the previous access register 123a-1 into the pre-fetch prediction table 122, as shown by the arrow 91 in FIG. 6 (step S54).

On the other hand, if a valid entry corresponding to the area address a exists, and the prediction address registered in the entry paired with a is not b (present access area address), actual number of continuous access and actual prediction address in the entry are changed to n, b respectively (steps S53, S55, S56).

Besides, if a valid entry corresponding to the area address a exists, and the prediction address registered in the entry paired with a is b (present access area address), actual number of continuous access in the entry is changed to n (steps S53, S55, S57).

Here, if a valid corresponding entry exists, the processing of the step S56 may be performed, irrespective of whether the prediction address registered in the entry paired with a is b or not.

Then the controller 123 changes respectively the area address a in the previous access register 123a to the present access area address b, and the continuous access number n+1 to the number (size) of continuous access (beginning from b) of the present access (step S58) and terminates a series of prediction table registration processing (step S34).

Similarly, as an example in FIG. 9, when readout access for the area address c following the readout access of b, b+1, . . . b+m is continued, entry information including the area address=b, the number of continuous access=m, a prediction address=c is registered in the pre-fetch prediction table 122, as shown by the arrow 92.

Figure 7:
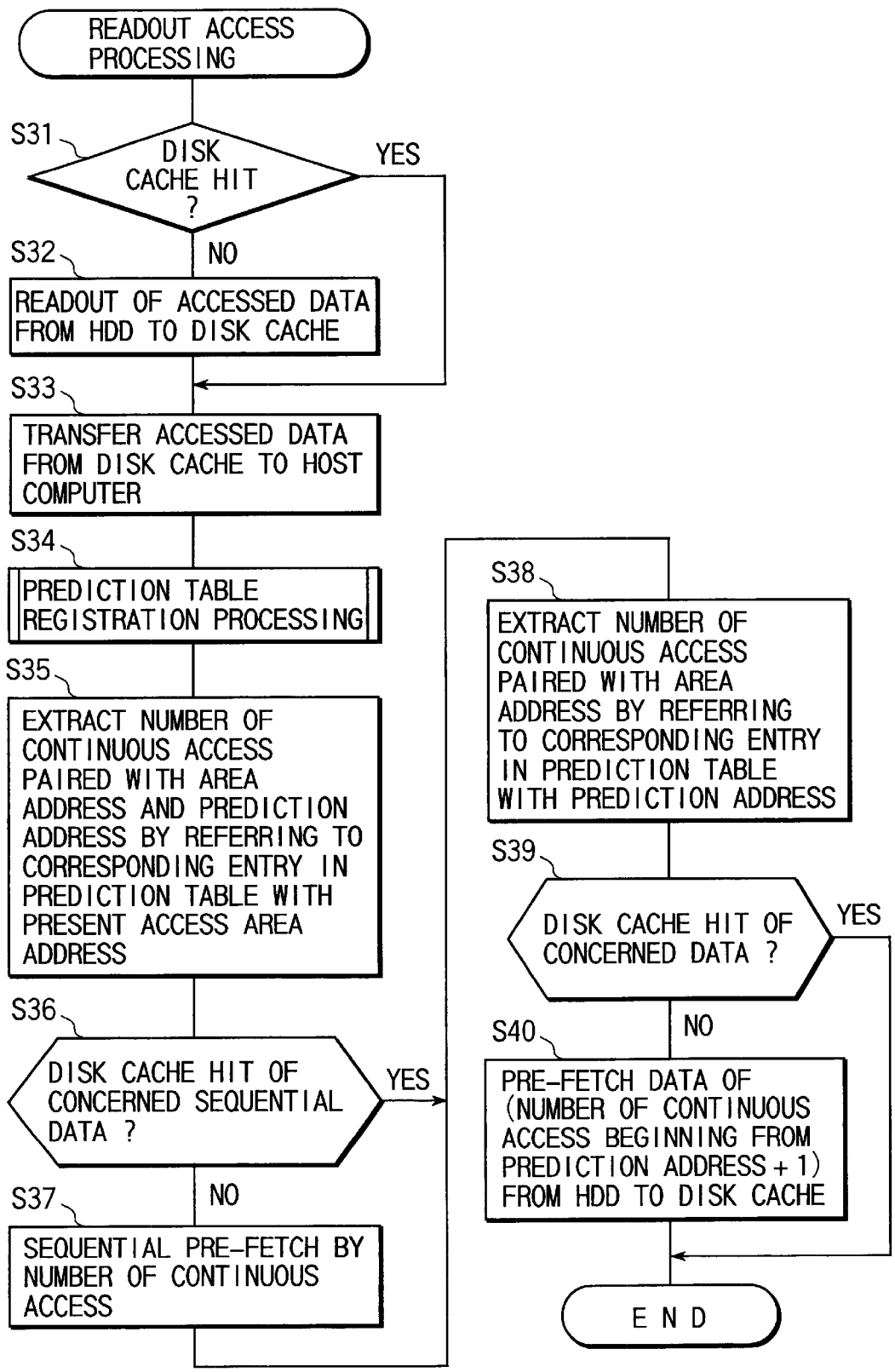
FIG. 7 a flow chart showing the procedure of readout access processing in a third embodiment of the present invention.
Figure 8:
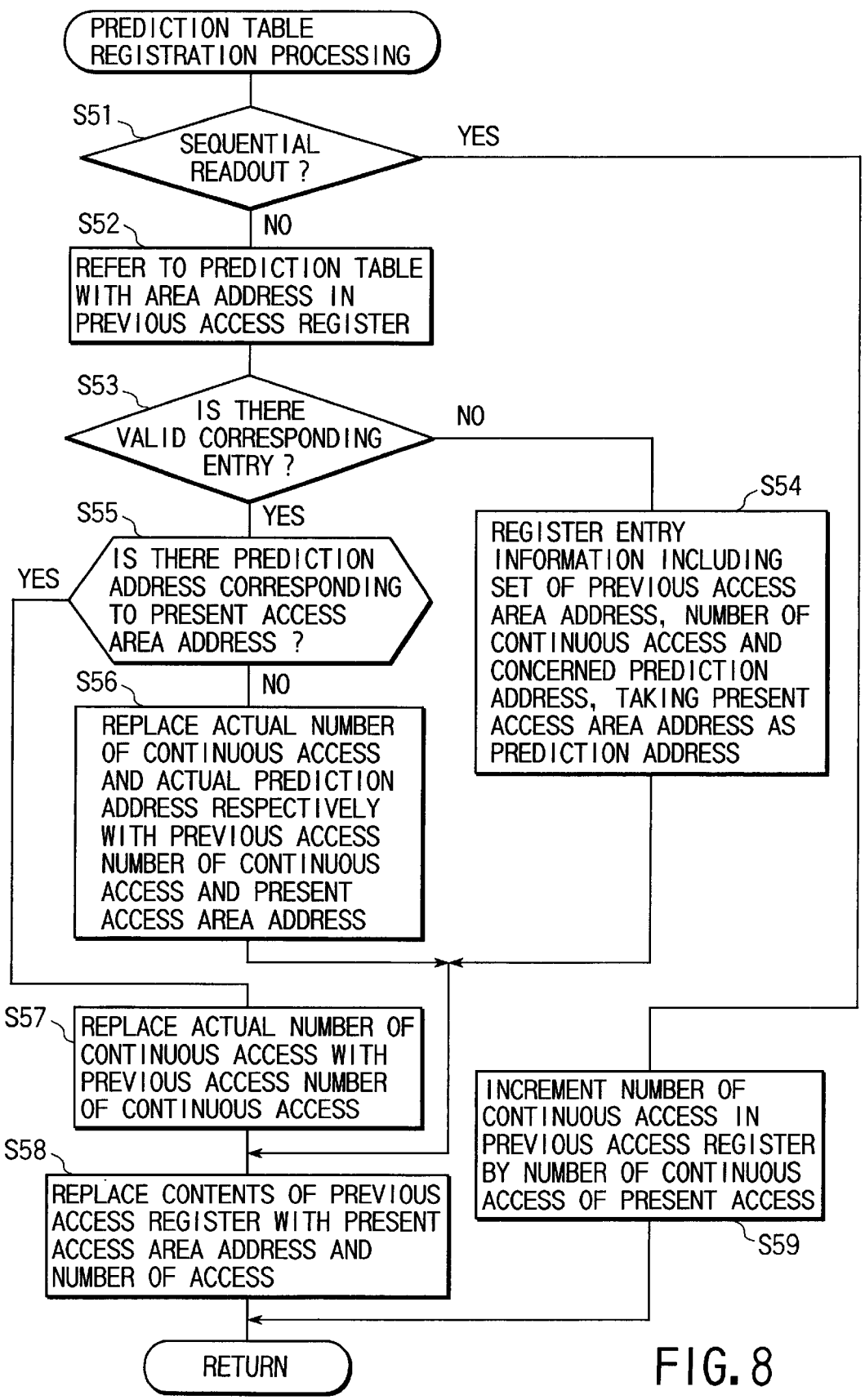
FIG. 8 is a flow chart showing the procedure of prediction table registration processing (step S34) in FIG. 7.

In this embodiment to which such prediction table registration processing is applied, when a data readout access for the address a is sent from the host computer 20, an operation to pre-fetch sequentially data of the number of continuous access from the following a+1, namely data from a+1 to a+n is performed, based on the entry information in the pre-fetch prediction table 122 corresponding to the area address a, as shown by the flow chart of FIG. 7 (step S36, S37).

Following to this sequential pre-fetch, or in parallel with this sequential pre-fetch, a pre-fetch from b registered as prediction address paired with area address a in the pre-fetch prediction table 122 is performed (steps S38 to S40).

This pre-fetch is performed by referring to the pre-fetch prediction table 122 with b registered as prediction address paired with area address a, and extracting the number of continuous access and the prediction address (here, number of continuous access=m, prediction address=c) in the entry information having the b as area address, and data from b to the number of continuous access m+1, namely data from b to b+m will be pre-fetched.

Thus, in this embodiment, if data of a is read out, then sequential data from the following a+1 to a+n is read out, then data of b is read out, and further, with sequential data from the following b to b+m read out, if readout from a is accessed again, a sequential pre-fetch from a+1 to a+n determined by a, n is performed from the entry information of (a, n, b) corresponding to a, based on the entry information of the pre-fetch prediction table 122 including a set of area address, number of continuous access, and prediction address, and a sequential pre-fetch from b+1 to b+m determined by b, m is performed from the entry information of (b, m, c) corresponding to b in (a, n, b). This allows to lower the probability of occurrence of useless sequential pre-fetch.

Though, in the aforementioned description, the number of continuous access of each entry in the pre-fetch prediction table 122 indicated the area address side number of continuous access, namely, number of sequential readout access following the area address, it is not limited to this.

For example, it may well indicate the prediction area address side number of continuous access, namely, number of sequential readout access following the prediction address. In this case, for the example of FIG. 9, entry information of (a, m, b) may be registered, when readout of c is accessed. However, for this, the previous access register 123a should hold area address of the access before the previous access(first area address of the sequential readout before the previous one), the number of continuous access therefrom, and area address of the previous access (first area address of the previous sequential readout).

[Fourth embodiment]

Now, the fourth embodiment of the present invention will be described.

This embodiment is characterized by that an entry information registration method of the pre-fetch prediction table 122 applied to the third embodiment is devised.

To be more specific, a plurality of prediction addresses can be registered in each entry of the pre-fetch prediction table 122.

According to this, the control contents of the controller 123 are partially different from the third embodiment, but the block diagram of FIG. 1 is used for convenience.

Here, the procedure of readout access processing applied to this embodiment is shown in the flow chart of FIG. 10, the procedure of prediction table registration processing during the readout access processing in the flow chart of FIG. 11, and a concrete example in FIG. 12, and differences from the third embodiment will be described in detail.

First, when data readout is accessed from the host computer 20, processing S61 to S63 similar to the steps S31 to s33 in FIG. 7 are performed, before proceeding to the prediction table registration processing (step S64).

Figure 12:
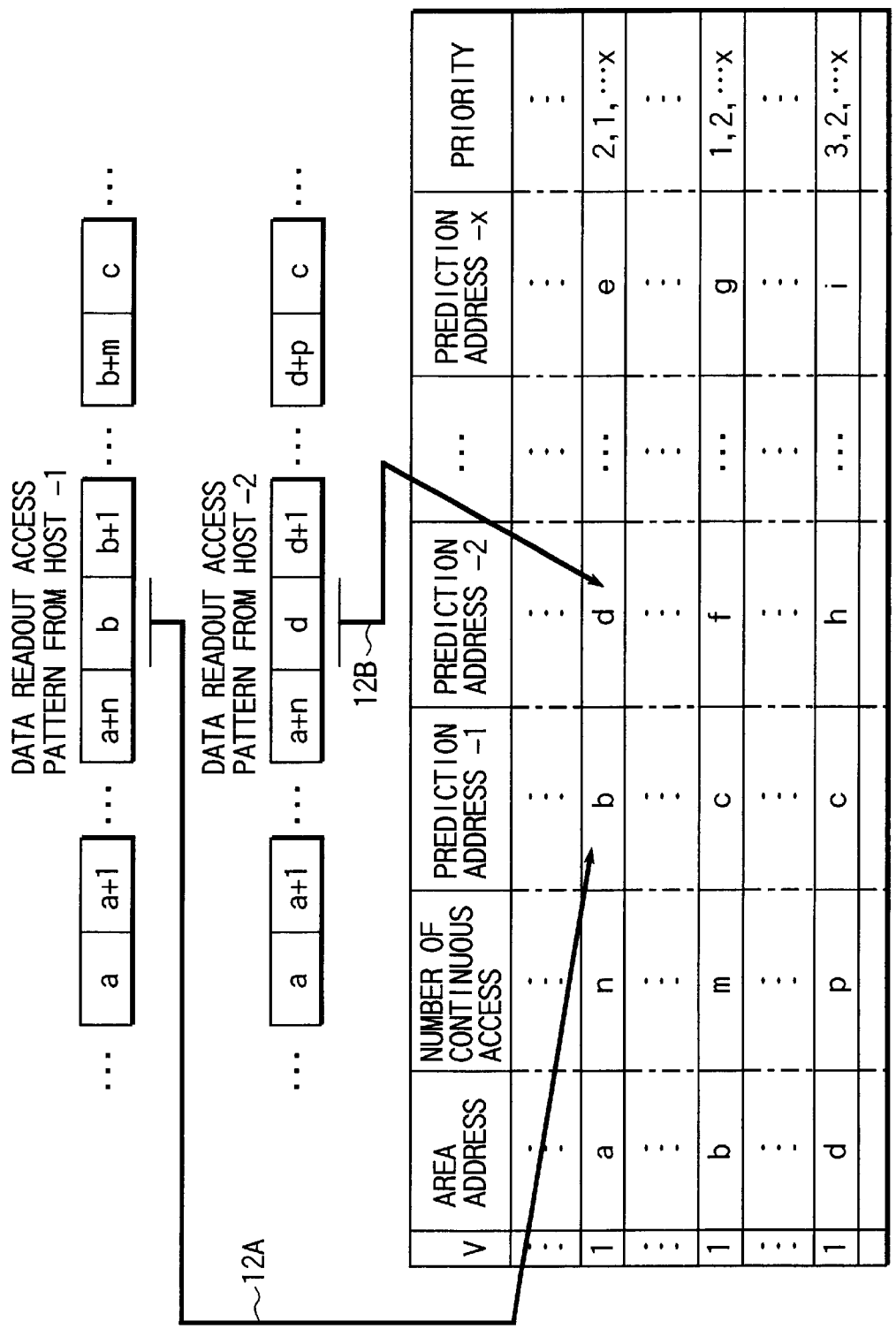
FIG. 12 is a drawing for illustrating a concrete example of prediction table registration processing in the fourth embodiment.

In this prediction table registration processing (step S64), as shown in the example of FIG. 12, entry information is registered in the pre-fetch prediction table 122 similarly to the third embodiment, when readout of a, a+1, . . . a+n is accessed, and then a readout access b discontinuous to this is emitted, or when readout of a, a+1, . . . a+n is accessed, and then a readout access d discontinuous to this is emitted, namely when it is not sequential readout any more (step S81). However, the registration method is partially different from the third embodiment.

Here, suppose that entry information including area address a, number n of continuous access, and prediction address b shown by the arrow 12A, that is entry information including a set of (a, n, b) is registered, as shown in FIG. 12, in an entry of the pre-fetch prediction table 122 similarly to the third embodiment, by the prediction table registration processing (step S64) when readout of a, a+1, . . . a+n is accessed, and then a readout access of b is emitted.

Thereafter, suppose readout of a, a+1, . . . a+n is accessed, and then a readout access d discontinuous to this is emitted, as shown this time in FIG. 12. In this case, in the third embodiment, (a, n, b) in the corresponding entry of the pre-fetch prediction table 122 would be replaced with (a, n, d), namely the prediction address changes from b to d.

However, in this solution, when readout of a, a+1, . . . a+n is accessed, and then a readout access b discontinuous to this is emitted, there is little chance the cache memory 121 be hit.

Therefore, in this embodiment, even when readout of a, a+1, . . . a+n is accessed, and then a readout access d discontinuous to this is emitted, d is separately registered additionally as prediction address d, as described below, without changing actual prediction address b.

In other words, if a valid entry corresponding to the previous access area address a exists in the pre-fetch prediction table 122, and the prediction address registered in the entry paired with a does not agree with the present access area address d (step S83, S85), the controller 123 checks if there is a vacant prediction address field in the entry (step S86).

If there is no vacant prediction address field, the least priority prediction address field among all prediction address fields (x prediction address fields in the example of FIG. 12) is secured as vacant field (step S87).

For this sake, each entry of the pre-fetch prediction table 122 is provided with a field (priority field) to register priority information for (prediction address set as) x prediction address fields in the entry. This priority may be decided by an algorithm known as LUR for example.

If there is already a vacant prediction address field, and there is no vacant prediction address field in any of prediction address field, the controller 123 secures a prediction address field in the step S87, and registers additionally the present access area address d as shown by the arrow 12B in FIG. 12 (step S88).

Thus, history of readout access for different area address respectively emitted following a series of same sequential readout access beginning with a is registered in the entry of the pre-fetch prediction table 122, with the upper limit of a certain number (x).

Here, for the sequential readout (step S81), previous access updating (step S91) similar to the step S59 of the third embodiment will be performed.

Moreover, when prediction address additional registration processing in the step S88 is performed, and when a valid entry corresponding to the previous access area address a exists, and the prediction address registered paired with a is not b (present access area address), the same processing as the step S57, S58 in the third embodiment is performed; namely, the number of continuous access in the entry is changed to the number of continuous access of previous access (value of the number of continuous access indicated the previous access register 123-1) (step S89), and the previous access register updating processing (step S90) for changing the contents of the previous access register 123a to present access area address and number of continuous access (size) is performed.

After the entry information registration processing of the step S84, the processing of the step S90 will be performed.

Figure 10:
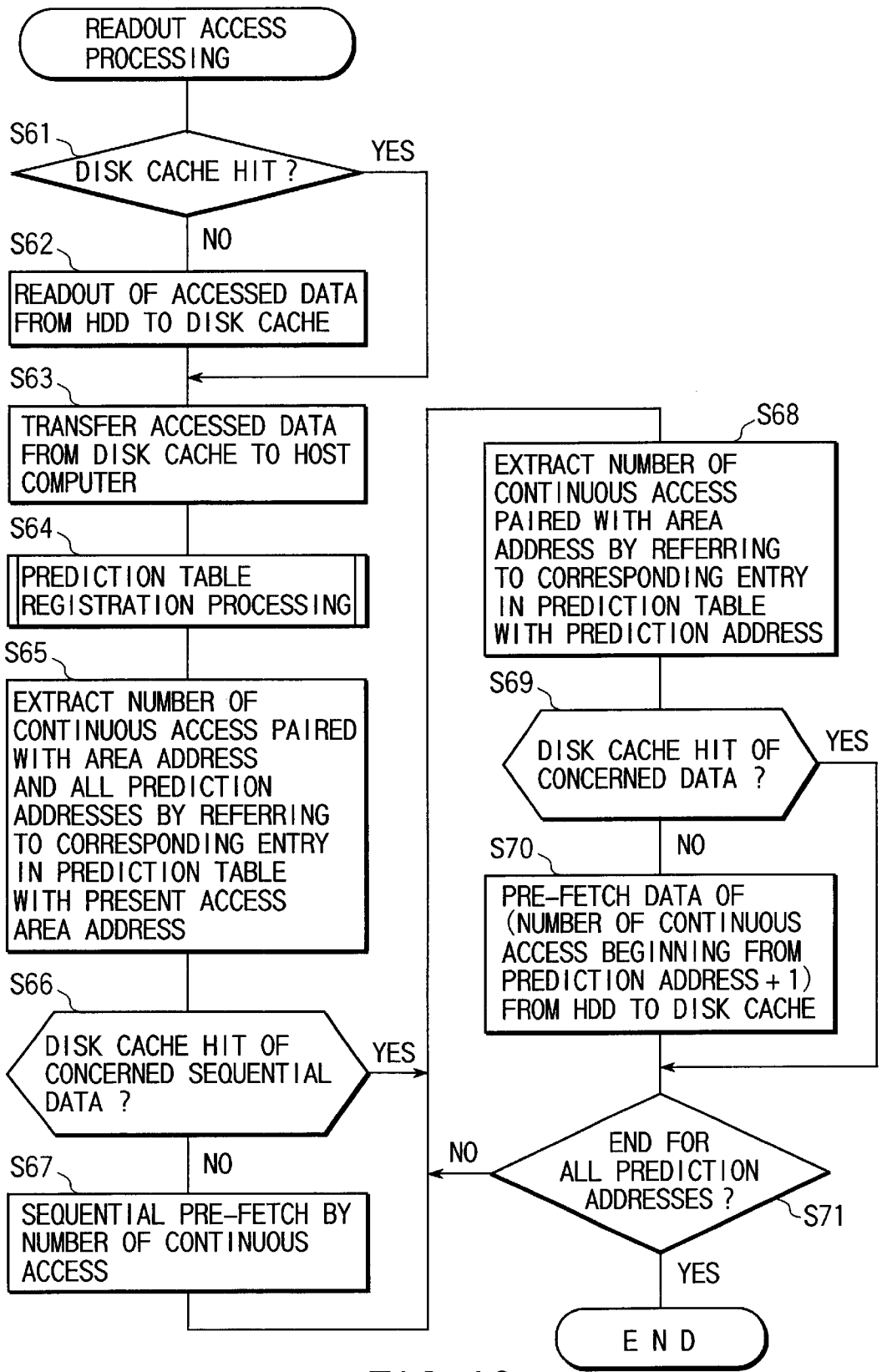
FIG. 10 is a flow chart showing the procedure of readout access processing in a fourth embodiment of the present invention.
Figure 11:
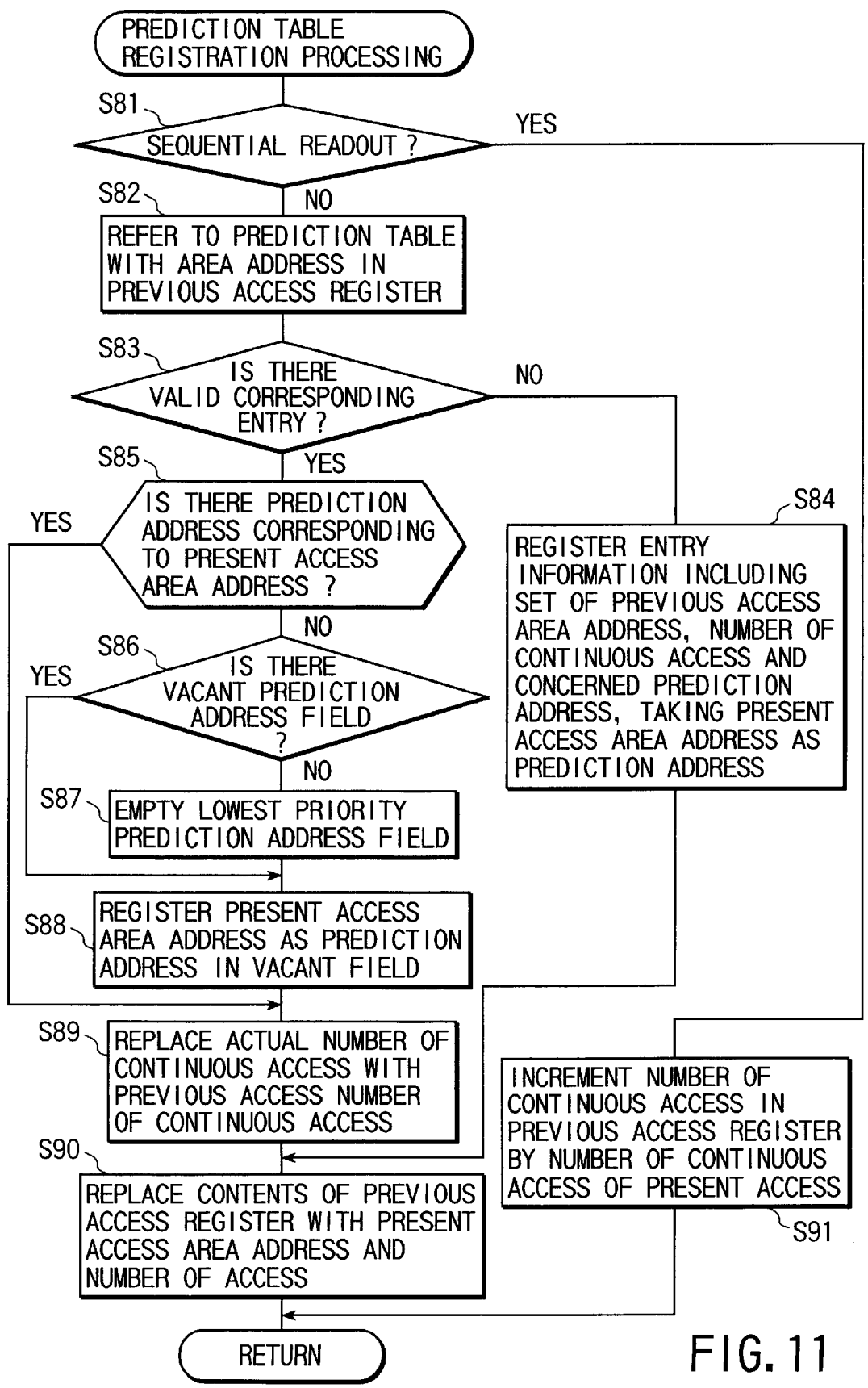
FIG. 11 is a flow chart showing the procedure of prediction table registration processing (step S64) in FIG. 10.

In this embodiment to which such prediction table registration processing is applied, when a readout access for the area address a is sent from the host computer 20 thereafter, the controller 123 extracts the number of continuous access (n in the example of FIG. 12) paired with the area address a, based on the entry information in the pre-fetch prediction table 122 corresponding to the area address a, as shown by the flow chart of FIG. 10, and all prediction addresses (b, d, . . . in the example of FIG. 12) (step S65).

Next, the controller 123 performs sequential pre-fetch by data of the number of continuous access from next a+1, namely by data of a+1 to a+n (step S66, S67).

Besides, as for all prediction addresses (b, d, . . . ) extracted in the step S65, the controller 123 refers to the corresponding entry in the pre-fetch prediction table 122 taking the prediction addresses (b, d, . . . ) as area address, and extracts the number of continuous access (m, p, . . . in the example of FIG. 12) paired with this area address (step S68).

Then the controller 123 performs sequential pre-fetch by data of the number of continuous access beginning from the area address (prediction address)+1, based on the area address (b, d, . . . ) and the number of continuous access (m, p, . . . in the example of FIG. 12) (step S69 to S71).

Thus, in this embodiment, the hit rate of the cache memory 121 can be further improved, because, a plurality of past readout histories are registered in the pre-fetch prediction table 122, and pre-fetch is performed respectively, using these histories.

Though, in the aforementioned description, pre-fetch based on the prediction address was performed for all prediction addressed registered in the same entry of the pre-fetch prediction table 122, it is not limited to this.

For example, it may well be composed to select a predetermined number (two, for instance) of prediction address from the most preferred one, and to pre-fetch based on those selected prediction addresses.

As mentioned in detail hereinbefore, the present invention allows to increase the disk cache hit rate, and speed up the data readout, because pre-fetch is performed effectively using the access history, during data readout.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk control device provided with a cache memory for temporary storing a part of data on a disk device, comprising:

a readout access history table for storing history of readout access from a host computer, wherein said readout access history table has a data structure for storing in a history set including a predetermined address portion whose predetermined unit area can be designated in an access destination address information indicated by respective readout access as a first readout access history, and access destination address information of the first readout access showing an access destination address information different from said respective readout access in predetermined address portion after said respective readout access as a second readout access history;

readout access execution means for transferring data accessed by the respective readout access to the host computer using said cache memory, when said respective readout access is given from the host computer;

registration means for registering readout access history corresponding to the respective readout access by linking a previous readout history; and pre-fetch means for pre-fetching following readout access data to said cache memory by referring the readout access history table when said following readout access data does not exist in said cache memory, wherein said pre-fetch means performs said pre-fetch according to said second readout access history among history sets having said predetermined address portion of said access destination address information indicated by said respective readout access given from said host computer as said first readout access history.

2. The disk control device according to claim 1, wherein said registration means comprises new registration means for newly registering, when a readout access different from the previous one in said predetermined address portion of access destination address information is given from said host computer and no history set including said first readout access history corresponding to a previous readout access of said given readout access exist in said readout access history table, a history set including said first readout access history corresponding to said previous readout access, and said second readout access history corresponding to said given readout access, in said readout access history table.

3. The disk control device according to claim 1, wherein said registration means comprises modification registration means for modifying, when a readout access is given from said host computer, a history set including said first readout access history corresponding to a previous readout access of said given readout access exists in said readout access history table and, at least, said second readout access history corresponding to said given readout access is not included in said history set, said second readout access history in said history set into the second readout access history corresponding to said given readout access.

4. A disk control device provided with a cache memory for temporarily storing a part of data on a disk device, comprising:

a readout access history table for storing history of readout access from a host computer wherein said readout access history table has a data structure for storing in a history set having access destination address information indicated by each readout access as a first readout access history, and access destination address information indicated by first readout access out of sequential readout beginning from said access destination address information indicated by said each readout access following said each readout access as a second readout access history, the history set including information of the number of continuous access in said sequential readout;

readout access execution means for transferring data accessed by the each readout access to the host computer using said cache memory, when said each readout access is given from the host computer;

registration means for registering readout access history corresponding to the each readout access by linking a previous readout history; and pre-fetch means for pre-fetching following readout access data to said cache memory by referring the readout access history table when said following readout access data does not exist in said cache memory, wherein said pre-fetch means performs said pre-fetch according to said information of the number of continuous access corresponding to said second readout access history among history sets having access destination address information indicated by said each readout access given by said host computer as said first readout access history.

5. The disk control device according to claim 4, wherein said registration means, comprises new registration means for newly registering, when a readout access out of sequential readout is given from said host computer and no history set including said first readout access history corresponding to a previous readout access that is a readout access indicating access destination address information of the leading head of said sequential readout exist in said readout access history table, a history set including said first readout access history corresponding to said previous readout access, said second readout access history corresponding to said given readout access, and information of the number of continuous access in said sequential readout, in said readout access history table.

6. The disk control device according to claim 4, wherein said registration means comprises modification registration means for modifying, when a readout access out of sequential readout is given from said host computer, a history set including said first readout access history corresponding to a previous readout access that is a readout access indicating access destination address information of the leading head of said sequential readout exists in said readout access history table, and at least, said second readout access history corresponding to said given readout access is not included in the history set, said second readout access history in the history set to the second readout access history corresponding to said given readout access, and information of the number of continuous access in the history set to the information of the number of continuous access in the sequential readout.

7. The disk control device according to claim 4, further comprising sequential pre-fetch means for pre-fetching data following the data accessed by the readout access given by said host computer, according to said information of the number of continuous access stored in said readout access history table paired with said first readout access history corresponding to the readout access.

8. A disk control device provided with a cache memory for temporarily storing a part of data on a disk device, comprising:

a readout access history table for storing history of readout access from a host computer, wherein said readout access history table has a data structure for storing in a history set retaining access destination address information indicated by each readout access as a first readout access history, and retaining access destination address information indicated by the first readout access out of the sequential readout beginning from said access destination address information indicated by said each readout access, obtained after said each readout access each time said each readout access is given as a second readout access history within the upper limit of a predetermined number, the history set including information of the number of continuous access in said sequential readout;

readout access execution means for transferring data accessed by the each readout access to the host computer using said cache memory, when said readout access is given from the host computer;

registration means for registering readout access history corresponding to the each readout access by linking a previous readout history; and pre-fetch means for pre-fetching following readout access data to said cache memory by referring the readout access history table when said following readout access data does not exist in said cache memory, wherein said pre-fetch means performs said pre-fetch according to information of the number of continuous access corresponding to all of said second readout access history among history sets having access destination address information indicated by said each readout access given by said host computer as said first readout access history.

9. The disk control device according to claim 8, wherein said registration means comprises new registration means for newly registering, when a readout access out of sequential readout is given from said host computer and no history set including said first readout access history corresponding to a previous readout access that is a readout access indicating access destination address information of the leading head of said sequential readout exists in said readout access history table, a history set including said first readout access history corresponding to said previous readout access, said second readout access history corresponding to said given readout access, and information of the number of continuous access in said sequential readout, in said readout access history table.

10. The disk control device according to claim 8, wherein said registration means comprises addition and modification means for additionally registering, when a readout access out of sequential readout is given from said host computer, a history set including said first readout access history corresponding to a previous readout access that is a readout access indicating access destination address information of the leading head of said sequential readout exists in said readout access history table, and at least, said second readout access history corresponding to said given readout access is not included in the history set, said second readout access history corresponding to said given readout access in the history set, if the number of said second readout access history included in the history set has not attained said predetermined number, and for modifying one of said second readout access history of any one of the history sets to said second readout access history corresponding to said given readout access.

* * * * *